United States Patent
Gallivanoni et al.

(10) Patent No.: US 11,057,969 B2
(45) Date of Patent: Jul. 6, 2021

(54) LOW COST SOLID STATE RF GENERATION SYSTEM FOR ELECTROMAGNETIC COOKING

(71) Applicant: WHIRLPOOL CORPORATION, Benton Harbor, MI (US)

(72) Inventors: Andrea Gallivanoni, Casorate Sempione (IT); Cristiano Vito Pastore, Comerio (IT); Matteo Rinaldi, Salerno (IT); Natalia Roumpedaki, Ternate (IT)

(73) Assignee: Whirlpool Corporation, Benton Harbor, MI (US)

( * ) Notice: Subject to any disclaimer, the term of this patent is extended or adjusted under 35 U.S.C. 154(b) by 133 days.

(21) Appl. No.: 16/308,015

(22) PCT Filed: Dec. 27, 2016

(86) PCT No.: PCT/US2016/068679
§ 371 (c)(1),
(2) Date: Dec. 7, 2018

(87) PCT Pub. No.: WO2018/125041
PCT Pub. Date: Jul. 5, 2018

(65) Prior Publication Data
US 2019/0313490 A1    Oct. 10, 2019

(51) Int. Cl.
*H05B 6/70* (2006.01)
*H05B 6/06* (2006.01)
(Continued)

(52) U.S. Cl.
CPC ............... *H05B 6/70* (2013.01); *H02M 1/15* (2013.01); *H05B 6/062* (2013.01); *H05B 6/681* (2013.01);
(Continued)

(58) Field of Classification Search
CPC .......... H05B 6/72; H05B 6/681; H05B 6/705; H05B 6/70; H05B 6/686; H05B 6/664;
(Continued)

(56) References Cited

U.S. PATENT DOCUMENTS 4,340,849 A * 7/1982 Kuhn ........................ H02J 7/16
322/28
4,648,015 A    3/1987 Davis et al.
(Continued)

FOREIGN PATENT DOCUMENTS

CN          201846496 U    5/2011
CN          202406018 U    8/2012
(Continued)

*Primary Examiner* — Ibrahime A Abraham
*Assistant Examiner* — John J Norton
(74) *Attorney, Agent, or Firm* — Price Heneveld LLP

(57) ABSTRACT

A solid state radio frequency generation system is provided for an electromagnetic cooking device having an enclosed cavity. The radio frequency generation system includes: an RF feed for introducing electromagnetic radiation into the cavity to heat a food load; a high-power RF amplifier coupled to the RF feed, the amplifier comprising at least one amplifying stage configured to output a signal that is amplified in power with respect to an input RF signal; a small signal generator for supplying the input RF signal to the amplifier; and a switching power supply unit including a single DC-DC converter that converts AC mains power to low voltage DC for supply to the amplifier, and a controller configured to adapt an input current from the AC mains power to form a predefined periodic waveform with the same frequency as the AC mains power for supply to the small signal generator.

20 Claims, 10 Drawing Sheets

(51) Int. Cl.
*H05B 6/68* (2006.01)
*H05B 6/72* (2006.01)
*H02M 1/15* (2006.01)

(52) U.S. Cl.
CPC .............. *H05B 6/705* (2013.01); *H05B 6/72* (2013.01); *Y02B 40/00* (2013.01)

(58) Field of Classification Search
CPC .............. Y02B 40/00; H03F 2200/459; H04B 2215/069; H02H 7/1255; H02M 1/15
See application file for complete search history.

(56) References Cited

U.S. PATENT DOCUMENTS

| | | | |
|---|---|---|---|
| 5,293,020 A | | 3/1994 | Han et al. |
| 5,594,632 A | * | 1/1997 | Barrett .................... H02M 1/15 363/44 |
| 6,295,214 B1 | | 9/2001 | Matsumoto et al. |
| 6,781,452 B2 | | 8/2004 | Cioffi et al. |
| 7,091,777 B2 | | 8/2006 | Lynch |
| 8,144,440 B2 | | 3/2012 | Aoki |
| 2007/0216343 A1 | * | 9/2007 | Rozman .............. H02M 5/4585 318/811 |
| 2010/0270930 A1 | * | 10/2010 | Hui ........................ H05B 45/37 315/112 |
| 2011/0292699 A1 | * | 12/2011 | Goerke ................... H02M 1/15 363/84 |
| 2013/0128629 A1 | * | 5/2013 | Clare ...................... H02M 1/15 363/35 |
| 2013/0313250 A1 | | 11/2013 | Ibragimov et al. |
| 2014/0252973 A1 | * | 9/2014 | Liu ........................ H02M 1/42 315/200 R |
| 2015/0271877 A1 | * | 9/2015 | Johansson .............. H05B 6/664 219/750 |
| 2016/0095171 A1 | | 3/2016 | Chaimov et al. |
| 2017/0025970 A1 | * | 1/2017 | Horst .................. H02M 7/1555 |

FOREIGN PATENT DOCUMENTS

| | | |
|---|---|---|
| CN | 103153814 A | 6/2013 |
| CN | 104115234 A | 10/2014 |
| CN | 104219810 A | 12/2014 |
| CN | 204795668 U | 11/2015 |
| CN | 105142255 A | 12/2015 |
| EP | 0601858 A1 | 6/1994 |
| JP | 2008060017 A | 3/2008 |
| JP | 2011146143 A | 7/2011 |
| RU | 2122338 C1 | 11/1998 |
| WO | 2007080859 A1 | 7/2007 |
| WO | 2015099649 A1 | 7/2015 |
| WO | 2015099650 A1 | 7/2015 |
| WO | 2015099651 A1 | 7/2015 |
| WO | 2015142573 A1 | 9/2015 |
| WO | 2016144872 A1 | 9/2016 |

* cited by examiner

LOW COST SOLID STATE RF GENERATION SYSTEM FOR ELECTROMAGNETIC COOKING

BACKGROUND

The present device generally relates to a low cost solid state radio frequency (RF) generation system for an electromagnetic cooking device, and more specifically, to a main power supply unit in a low cost solid state RF generation system.

A conventional microwave oven cooks food by a process of dielectric heating in which a high-frequency alternating electromagnetic field is distributed throughout an enclosed cavity. A sub-band of the radio frequency spectrum, microwave frequencies at or around 2.45 GHz cause dielectric heating primarily by absorption of energy in water.

To generate microwave frequency radiation in a conventional microwave, a voltage applied to a high-voltage transformer of a high-power amplifier results in a high-voltage power that is applied to a magnetron that generates microwave frequency radiation. The microwaves are then transmitted to an enclosed cavity containing the food through a waveguide. Cooking food in an enclosed cavity with a single, non-coherent source like a magnetron can result in non-uniform heating of the food. To more evenly heat food, microwave ovens include, among other things, mechanical solutions such as a microwave stirrer and a turntable for rotating the food. A common magnetron-based microwave source is not narrowband and not tunable (i.e. emits microwaves at a frequency that is changing over time and not selectable). As an alternative to such a common magnetron-based microwave source, solid-state sources can be included in microwave ovens which are tunable and coherent.

Prior art solutions to power a high-power amplifier include using a conventional AC-DC power supply. For example, FIG. 1 illustrates a prior art power supply unit architecture with a 1 kW power rating. The prior art power supply unit includes a high voltage AC to high DC conversion component that includes a power factor correction (PFC) sub-component. The prior art power supply unit includes a second stage high voltage DC to low voltage DC conversion component that implements galvanic isolation.

The purpose of the AC-DC PFC conversion stage is to drain a current from the mains line whose waveform is nearly sinusoidal and in-phase with the mains voltage. A typical embodiment of an AC-DC PFC conversion stage in the prior art power supply unit architecture is illustrated in FIG. 2. The power factor corrector includes a rectifier, an inductor, an electronic switch (e.g. MOSFET, IGBT, etc.), a fast recovery diode, an output capacitor and a controller. The load of the PFC stage is the subsequent DC-DC conversion stage. Even in this minimal implementation form, the cost of a power factor corrector stage is typical about 30% of the cost of a 1 kW AC-DC power supply unit. In short, prior art solutions are inefficient and expensive.

Other prior art topologies for a power supply unit are known that combine the functions of both the AC-DC conversion and the DC-DC conversion stage. However, these known topologies are complex and include a component overdesign with respect to a basic DC-DC convertor of a comparable wattage. For example, a single stage AC-DC conversion topology is shown in FIG. 3, which illustrates a boosting full bridge, which is derived from the conventional phase-shifted full bridge DC-DC convertor. In this topology, the two lower legs of the bridge implement the function of a PFC. One limitation of such a design is the requirement of an energy storage tank to feed the DC load whenever the AC instantaneous power goes to zero, which happens twice per mains period near the zero crossings. For example, when using capacitive storage at the DC output, the typical amount of energy needed to feed a 1 kW load at 28 V for 5 ms (i.e. one-fourth the mains cycle duration in a 50 Hz distribution system) is:

$$C = 2Pt/V^2 = 2 \cdot 1000 \cdot 0.005/28^2 = 12.3 \text{ mF@28V}$$

When using capacitive storage at a 400 V DC, the necessary capacitance is:

$$C = 2Pt/V^2 = 2 \cdot 1000 \cdot 0.005/400^2 = 62.5 \text{ uF@400V}$$

The cost and physical size of such capacitors would be prohibitive. Additionally, the capacitance would supply the RF power supply for a relatively long period after cutting off mains power which would need to be mitigated when the microwave oven door is opened.

SUMMARY

In one aspect, a solid state radio frequency generation system is provided for an electromagnetic cooking device having an enclosed cavity in which a food load is placed. The solid state radio frequency generation system comprises: an RF feed configured to introduce electromagnetic radiation into the enclosed cavity to heat up and prepare the food load; a high-power RF amplifier coupled to the RF feed, the high-power RF amplifier comprising at least one amplifying stage configured to output a signal that is amplified in power with respect to an input RF signal; a small signal generator coupled to the high-power RF amplifier for generating the input RF signal; and a switching power supply unit coupled to the high-power RF amplifier and the small signal generator, wherein the switching power supply unit comprises a single AC-DC converter component that converts AC mains power to low voltage DC that is output to the high-power RF amplifier, and a controller configured to distort a sinusoidal input current from the AC mains power to form a predefined periodic non-sinusoidal waveform with the same frequency as the AC mains power in order to minimize output voltage ripple.

In another aspect, a solid state radio frequency generation system is provided for an electromagnetic cooking device having an enclosed cavity in which a food load is placed. The solid state radio frequency generation system comprises: a plurality of RF feeds configured to introduce electromagnetic radiation into the enclosed cavity to heat up and prepare the food load; a set of high-power RF amplifiers coupled to the plurality of RF feeds, each high-power RF amplifier comprising at least one amplifying stage configured to output a signal that is amplified in power with respect to an input RF signal; a small signal generator coupled to the set of high-power RF amplifiers for generating the input RF signal; and at least one switching power supply unit coupled to the set of high-power RF amplifiers and the small signal generator, wherein the at least one switching power supply unit comprises at least one single stage AC-DC converter component that converts AC mains power to low voltage DC that is output to the set of high-power RF amplifiers, and a controller configured to distort a sinusoidal input current from the AC mains power to form a predefined periodic non-sinusoidal waveform with the same frequency as the AC mains power in order to minimize output voltage ripple.

In one aspect, an electromagnetic cooking device is provided comprising: an enclosed cavity in which a food load is placed; a plurality of RF feeds configured to introduce electromagnetic radiation into the enclosed cavity to heat up and prepare the food load; a set of high-power RF amplifiers coupled to the plurality of RF feeds, each high-power RF amplifier comprising at least one amplifying stage configured to output a signal that is amplified in power with respect to an input RF signal; a small signal generator coupled to the set of high-power RF amplifiers for generating the input RF signal; and a switching power supply unit coupled to the set of high-power RF amplifiers and the small signal generator, wherein the switching power supply unit comprises at least one single stage AC-DC converter component that converts AC mains power to low voltage DC that is output to the set of high-power RF amplifiers, and a controller configured to distort a sinusoidal input current from the AC mains power to form a predefined periodic non-sinusoidal waveform with the same frequency as the AC mains power in order to minimize output voltage ripple, wherein the controller is further configured to modulate an amplitude of the input RF signal generated by the small signal generator based on the low voltage DC output by the switching power supply unit.

DETAILED DESCRIPTION

It is to be understood that the specific devices and processes illustrated in the attached drawings, and described in the following specification are simply exemplary embodiments of the inventive concepts defined in the appended claims. Hence, other physical characteristics relating to the embodiments disclosed herein are not to be considered as limiting, unless the claims expressly state otherwise.

A solid-state radio frequency (RF) cooking appliance heats up and prepares food by introducing electromagnetic radiation into an enclosed cavity. Multiple RF feeds at different locations in the enclosed cavity produce dynamic electromagnetic wave patterns as they radiate. To control and shape of the wave patterns in the enclosed cavity, the multiple RF feeds can radiate waves with separately controlled electromagnetic characteristics to maintain coherence (that is, a stationary interference pattern) within the enclosed cavity. For example, each RF feed can transmit a different frequency, phase and/or amplitude with respect to the other feeds. Other electromagnetic characteristics can be common among the RF feeds. For example, each RF feed can transmit at a common but variable frequency. Although the following embodiments are directed to a cooking appliance where RF feeds direct electromagnetic radiation to heat an object in an enclosed cavity, it will be understood that the methods described herein and the inventive concepts derived therefrom are not so limited. The covered concepts and methods are applicable to any RF device where electromagnetic radiation is directed to an enclosed cavity to act on an object inside the cavity. Exemplary devices include ovens, dryers, steamers, and the like.

Figure 4:
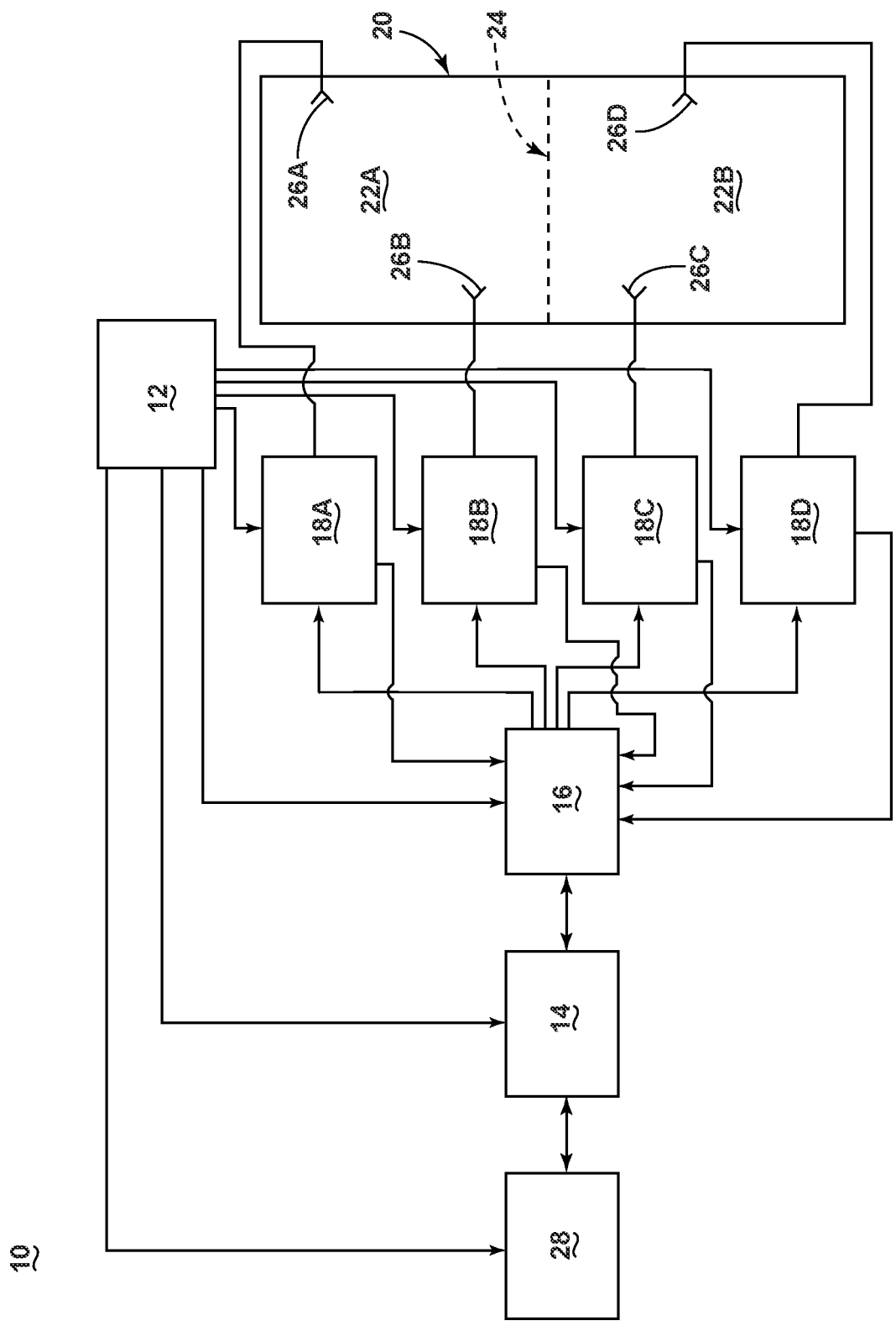
FIG. 4 is a block diagram of an electromagnetic cooking device with multiple coherent radio frequency feeds in accordance with various aspects described herein.

FIG. 4 shows a block diagram of an electromagnetic cooking device 10 with multiple coherent RF feeds 26A-D according to one embodiment. As shown in FIG. 4, the electromagnetic cooking device 10 includes a power supply unit 12, a controller 14, an RF signal generator 16, a human-machine interface 28 and multiple high-power RF amplifiers 18A-D coupled to the multiple RF feeds 26A-D. The multiple RF feeds 26A-D each transfer RF power from one of the multiple high-power RF amplifiers 18A-D into an enclosed cavity 20.

The power supply unit 12 provides electrical power derived from mains electricity to the controller 14, the RF signal generator 16, the human-machine interface 28 and the multiple high-power RF amplifiers 18A-D. The power supply 12 converts the mains electricity to the required power level of each of the devices it powers. The power supply 12 can deliver a variable output voltage level. For example, the power supply 12 can output a voltage level selectively controlled in 0.5-Volt steps. In this way, the power supply 12 can be configured to typically supply 28 Volts direct current to each of the high-power RF amplifiers 18A-D, but can supply a lower voltage, such as 15 Volts direct current, to decrease an RF output power level by a desired level. Additional details of the power supply unit 12 are described further below following a brief description of the other components of the electromagnetic cooking device 10.

A controller 14 can be included in the electromagnetic cooking device 10, which can be operably coupled with various components of the electromagnetic cooking device 10 to implement a cooking cycle. The controller 14 can also be operably coupled with a control panel or human-machine interface 28 for receiving user-selected inputs and communicating information to a user. The human-machine interface 28 can include operational controls such as dials, lights, switches, touch screen elements, and displays enabling a user to input commands, such as a cooking cycle, to the controller 14 and receive information. The user interface 28 can include one or more elements, which can be centralized or dispersed relative to each other. The controller 14 may also select the voltage level supplied by power supply 12.

The controller 14 can be provided with a memory and a central processing unit (CPU), and can be preferably embodied in a microcontroller. The memory can be used for storing control software that can be executed by the CPU in completing a cooking cycle. For example, the memory can store one or more pre-programmed cooking cycles that can be selected by a user and completed by the electromagnetic cooking device 10. The controller 14 can also receive input from one or more sensors. Non-limiting examples of sensors that can be communicably coupled with the controller 14 include peak level detectors known in the art of RF engineering for measuring RF power levels and temperature sensors for measuring the temperature of the enclosed cavity or one or more of the high-power amplifiers 18A-D.

Based on the user input provided by the human-machine interface 28 and data including the forward and backward (or reflected) power magnitudes coming from the multiple high-power amplifiers 18A-D (represented in FIG. 4 by the path from each of the high-power amplifiers 18A-D through the RF signal generator 16 to the controller 14), the controller 14 can determine the cooking strategy and calculate the settings for the RF signal generator 16. In this way, one of the main functions of the controller 14 is to actuate the electromagnetic cooking device 10 to instantiate the cooking cycle as initiated by the user. The RF signal generator 16 as described below then can generate multiple RF waveforms, that is, one for each high-power amplifier 18A-D based on the settings indicated by the controller 14.

The high-power amplifiers 18A-D, each coupled to one of the RF feeds 26A-D, each output a high-power RF signal based on a low power RF signal provided by the RF signal generator 16. The low power RF signal input to each of the high-power amplifiers 18A-D can be amplified by transforming the direct current electrical power provided by the power supply 12 into a high-power radio frequency signal. In one non-limiting example, each high-power amplifier 18A-D can be configured to output an RF signal ranging from 50 to 250 Watts. The maximum output wattage for each high-power amplifier can be more or less than 250 Watts depending upon the implementation. Each high-power amplifier 18A-D can include a dummy load to absorb excessive RF reflections.

The multiple RF feeds 26A-D transfer power from the multiple high-power RF amplifiers 18A-D to the enclosed cavity 20. The multiple RF feeds 26A-D can be coupled to the enclosed cavity 20 in spatially separated but fixed physical locations. The multiple RF feeds 26A-D can be implemented via waveguide structures designed for low power loss propagation of RF signals. In one non-limiting example, metallic, rectangular waveguides known in microwave engineering are capable of guiding RF power from a high-power amplifier 18A-D to the enclosed cavity 20 with a power attenuation of approximately 0.03 decibels per meter.

Additionally, each of the RF feeds 26A-D can include a sensing capability to measure the magnitude of the forward and the backward power levels or phase at the amplifier output. The measured backward power indicates a power level returned to the high-power amplifier 18A-D as a result of an impedance mismatch between the high-power amplifier 18A-D and the enclosed cavity 20. Besides providing feedback to the controller 14 and the RF signal generator 16 to implement, in part, a cooking strategy, the backward power level can indicate excess reflected power that can damage the high-power amplifier 18A-D.

Along with the determination of the backward power level at each of the high-power amplifiers 18A-D, temperature sensing at the high-power amplifier 18A-D, including at the dummy load, can provide the data necessary to determine if the backward power level has exceeded a predetermined threshold. If the threshold is exceeded, any of the controlling elements in the RF transmission chain including the power supply 12, controller 14, the RF signal generator 16, or the high-power amplifier 18A-D can determine that the high-power amplifier 18A-D can be switched to a lower power level or completely turned off. For example, each high-power amplifier 18A-D can switch itself off automatically if the backward power level or sensed temperature is too high for several milliseconds. Alternatively, the power supply 12 can cut the direct current power supplied to the high-power amplifier 18A-D.

The enclosed cavity 20 can selectively include subcavities 22A-B by insertion of an optional divider 24 therein. The enclosed cavity 20 can include, on at least one side, a shielded door to allow user access to the interior of the enclosed cavity 20 for placement and retrieval of food or the optional divider 24.

The transmitted bandwidth of each of the RF feeds 26A-D can include frequencies ranging from 2.4 GHz to 2.5 GHz. The RF feeds 26A-D can be configured to transmit other RF bands. For example, the bandwidth of frequencies between 2.4 GHz and 2.5 GHz is one of several bands that make up the industrial, scientific and medical (ISM) radio bands. The transmission of other RF bands is contemplated and can include non-limiting examples contained in the ISM bands defined by the frequencies: 13.553 MHz to 13.567 MHz, 26.957 MHz to 27.283 MHz, 902 MHz to 928 MHz, 5.725 GHz to 5.875 GHz and 24 GHz to 24.250 GHz.

Figure 5:
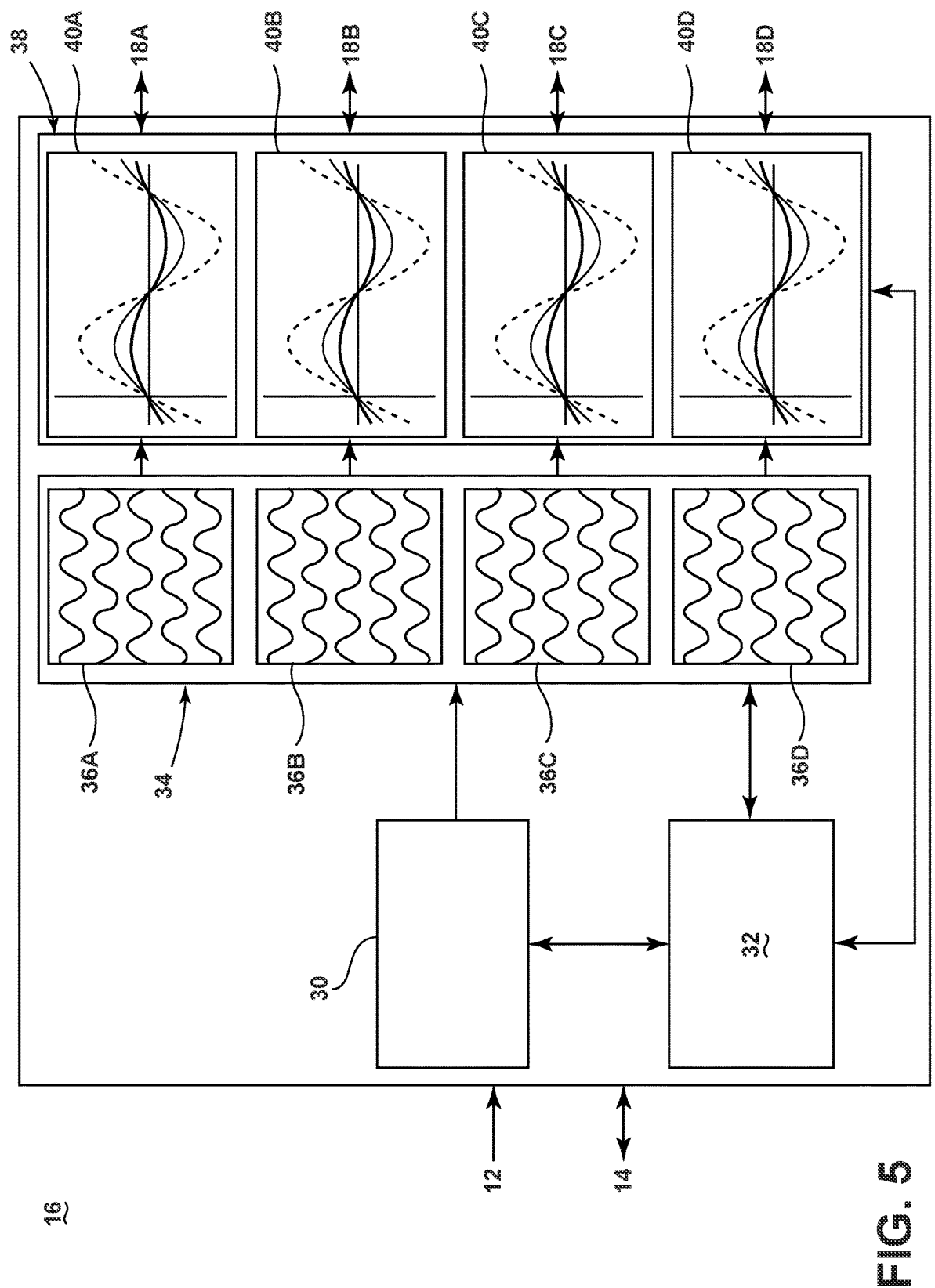
FIG. 5 is a block diagram of a radio frequency signal generator of FIG. 4.

Referring now to FIG. 5, a block diagram of the RF signal generator 16 is shown. The RF signal generator 16 includes a frequency generator 30, a phase generator 34 and an amplitude generator 38 sequentially coupled and all under the direction of an RF controller 32. In this way, the actual frequency, phases and amplitudes to be output from the RF signal generator 16 to the high-power amplifiers are programmable through the RF controller 32, preferably implemented as a digital control interface. The RF signal generator 16 can be physically separate from the cooking controller 14 or can be physically mounted onto or integrated into the controller 14. The RF signal generator 16 is preferably implemented as a bespoke integrated circuit.

As shown in FIG. 5 the RF signal generator 16 outputs four RF channels 40A-D that share a common but variable frequency (e.g. ranging from 2.4 GHz to 2.5 GHz), but are settable in phase and amplitude for each RF channel 40A-D. The configuration described herein is exemplary and should not be considered limiting. For example, the RF signal generator 16 can be configured to output more or less channels and can include the capability to output a unique variable frequency for each of the channels depending upon the implementation.

As previously described, the RF signal generator 16 can derive power from the power supply unit 12 and input one or more control signals from the controller 14. Additional inputs can include the forward and backward power levels determined by the high-power amplifiers 18A-D. Based on these inputs, the RF controller 32 can select a frequency and signal the frequency generator 30 to output a signal indicative of the selected frequency. As represented pictorially in the block representing the frequency generator 30 in FIG. 5, the selected frequency determines a sinusoidal signal whose frequency ranges across a set of discrete frequencies. In one non-limiting example, a selectable bandwidth ranging from 2.4 GHz to 2.5 GHz can be discretized at a resolution of 1 MHz allowing for 101 unique frequency selections.

After the frequency generator 30, the signal is divided per output channel and directed to the phase generator 34. Each channel can be assigned a distinct phase, that is, the initial angle of a sinusoidal function. As represented pictorially in the block representing the per channel phase generator 36A-D in FIG. 5, the selected phase of the RF signal for a channel can range across a set of discrete angles. In one non-limiting example, a selectable phase (wrapped across half a cycle of oscillation or 180 degrees) can be discretized at a resolution of 10 degrees allowing for 19 unique phase selections per channel.

Figure 1:
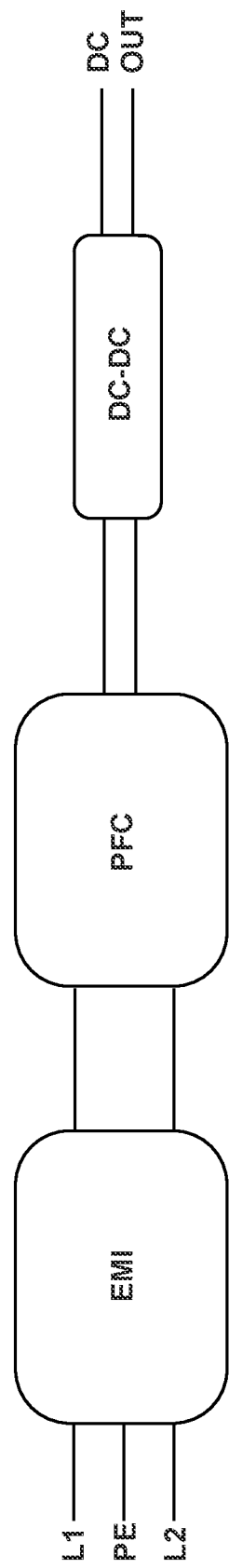
FIG. 1 is a block diagram of a prior art power supply unit architecture.
Figure 2:
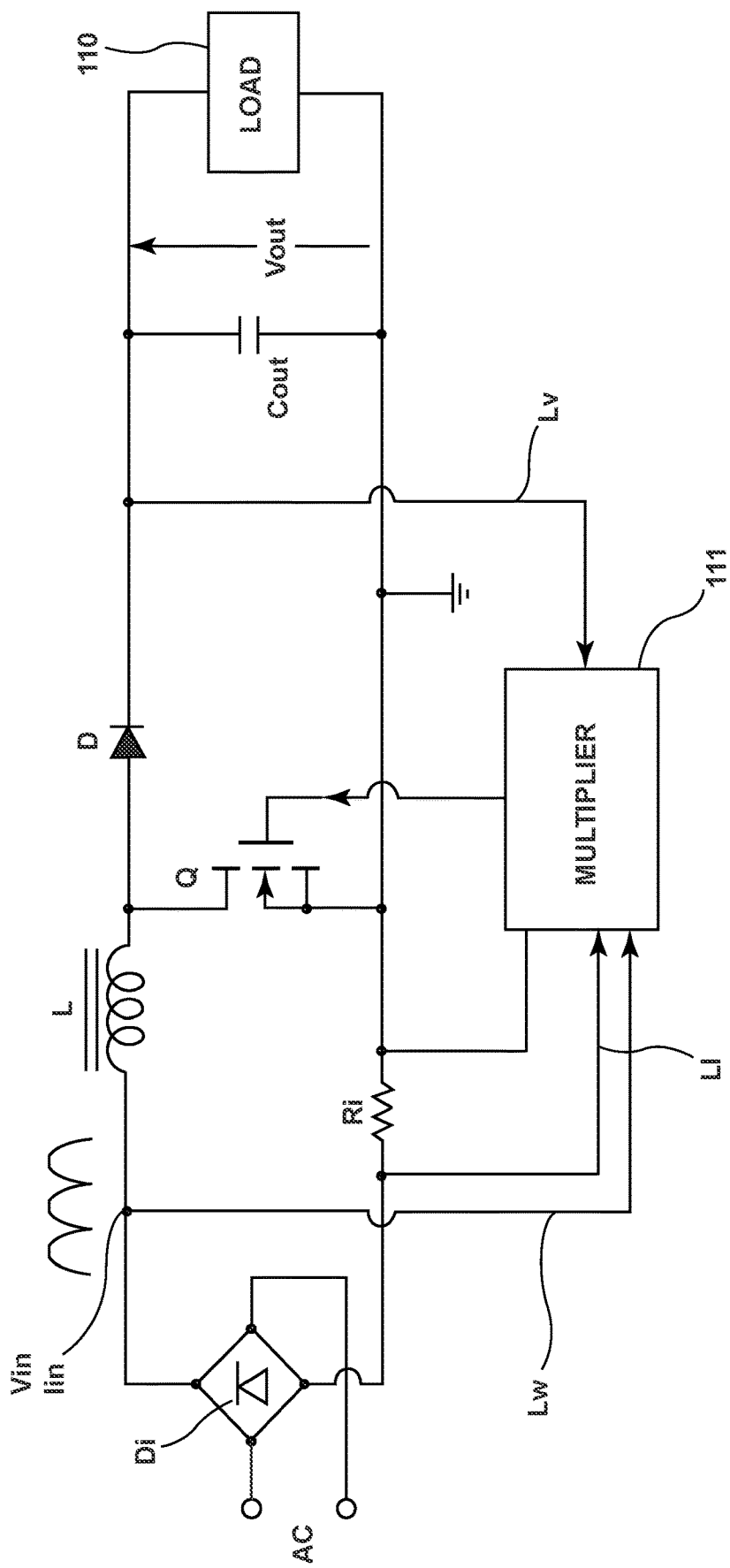
FIG. 2 is a partial block and partial schematic diagram of a prior art AC-DC PFC conversion stage of the power supply unit shown in FIG. 1.
Figure 3:
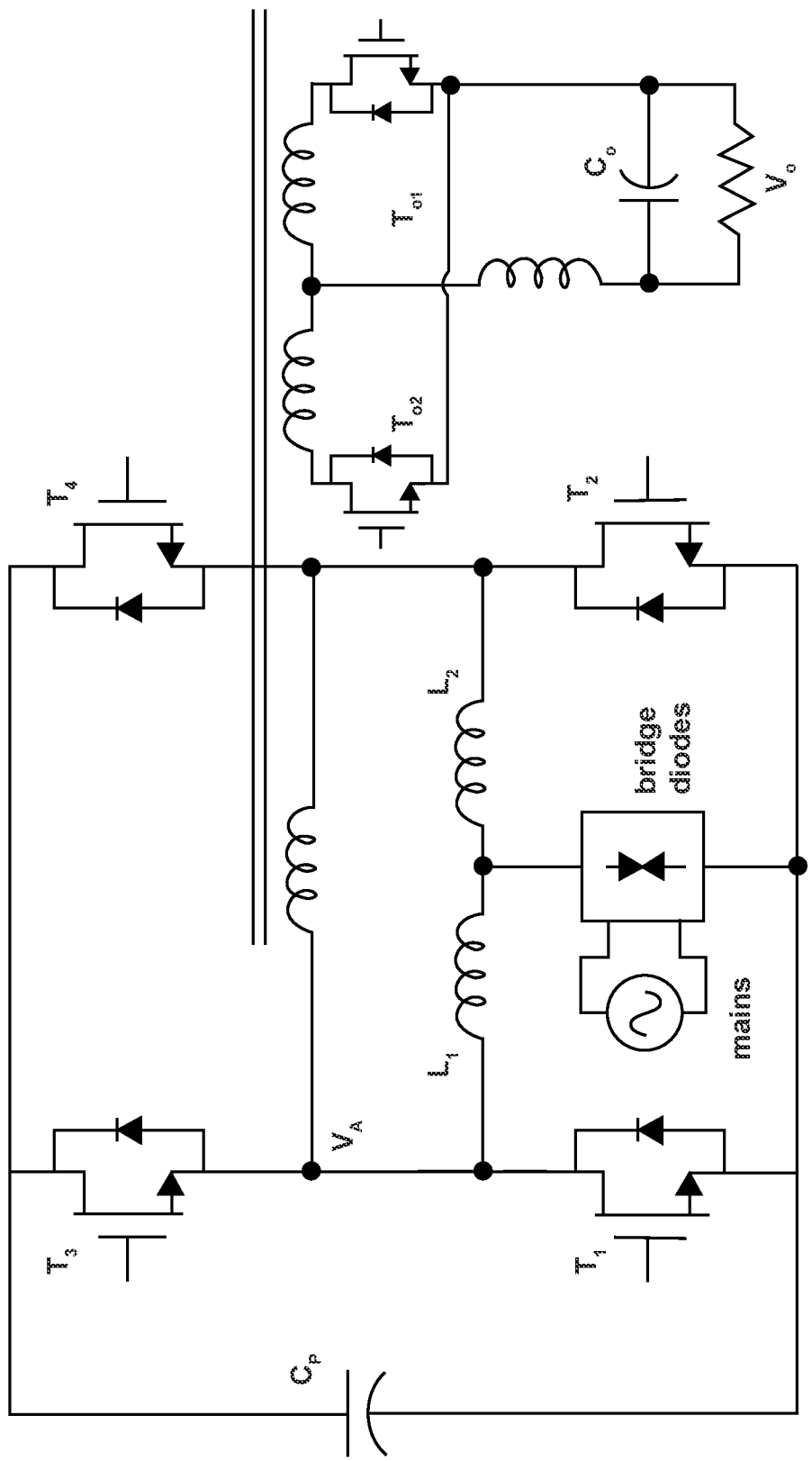
FIG. 3 is a schematic diagram of a single stage AC-DC conversion topology having a boosting full bridge.

Subsequent to the phase generator 34, the RF signal per channel can be directed to the amplitude generator 38. The RF controller 32 can assign each channel (shown in FIG. 5 with a common frequency and distinct phase) to output a distinct amplitude in the channel 40A-D. As represented pictorially in the block representing the per channel amplitude generator in FIG. 2, the selected amplitude of the RF signal can range across a set of discrete amplitudes (or power levels). In one non-limiting example, a selectable amplitude can be discretized at a resolution of 0.5 decibels across a range of 0 to 23 decibels allowing for 47 unique amplitude selections per channel.

The amplitude of each channel 40A-D can be controlled by one of several methods depending upon the implementation. For example, control of the supply voltage of the amplitude generator 38 for each channel can result in an output amplitude for each channel 40A-D from the RF signal generator 16 that is directly proportional to the desired RF signal output for the respective high-power amplifier 18A-D. Alternatively, the per channel output can be encoded as a pulse-width modulated signal where the amplitude level is encoded by the duty cycle of the pulse-width modulated signal. Yet another alternative is to coordinate the per channel output of the power supply unit 12 to vary the supply voltage supplied to each of the high-power amplifiers 18A-D to control the final amplitude of the RF signal transmitted to the enclosed cavity 20.

As described above, the electromagnetic cooking device 10 can deliver a controlled amount of power at multiple RF feeds 26A-D into the enclosed cavity 20. Further, by maintaining control of the amplitude, frequency and phase of the power delivered from each RF feed 26A-D, the electromagnetic cooking device 10 can coherently control the power delivered into the enclosed cavity 20. Coherent RF sources deliver power in a controlled manner to exploit the interference properties of electromagnetic waves. That is, over a defined area of space and duration of time, coherent RF sources can produce stationary interference patterns such that the electric field is distributed in an additive manner. Consequently, interference patterns can add to create an electromagnetic field distribution that is greater in amplitude than any of the RF sources (i.e. constructive interference) or less than any of the RF sources (i.e. destructive interference).

The coordination of the RF sources and characterization of the operating environment (i.e. the enclosed cavity and the contents within) can enable coherent control of the electromagnetic cooking and maximize the coupling of RF power with an object in the enclosed cavity 20. Efficient transmission into the operating environment can require calibration of the RF generating procedure. As described above, in an electromagnetic heating system, the power level can be controlled by many components including the voltage output from the power supply unit 12, the gain on stages of variable gain amplifiers including both the high-power amplifiers 18A-D and the amplitude generator 38, the tuning frequency of the frequency generator 30, etc. Other factors that affect the output power level include the age of the components, inter-component interaction and component temperature.

As noted above, prior art power supply units suffer from drawbacks of using a power factor correction (PFC) sub-component. The embodiments described below are advantageous in that they do not utilize the physical PFC stage but instead implement its function through a collaborative operation of a single stage AC-DC convertor component having minimum complexity. Further, the embodiments described below provide the advantage of reduced capacitive energy storage in the power supply unit 12.

Figure 6:
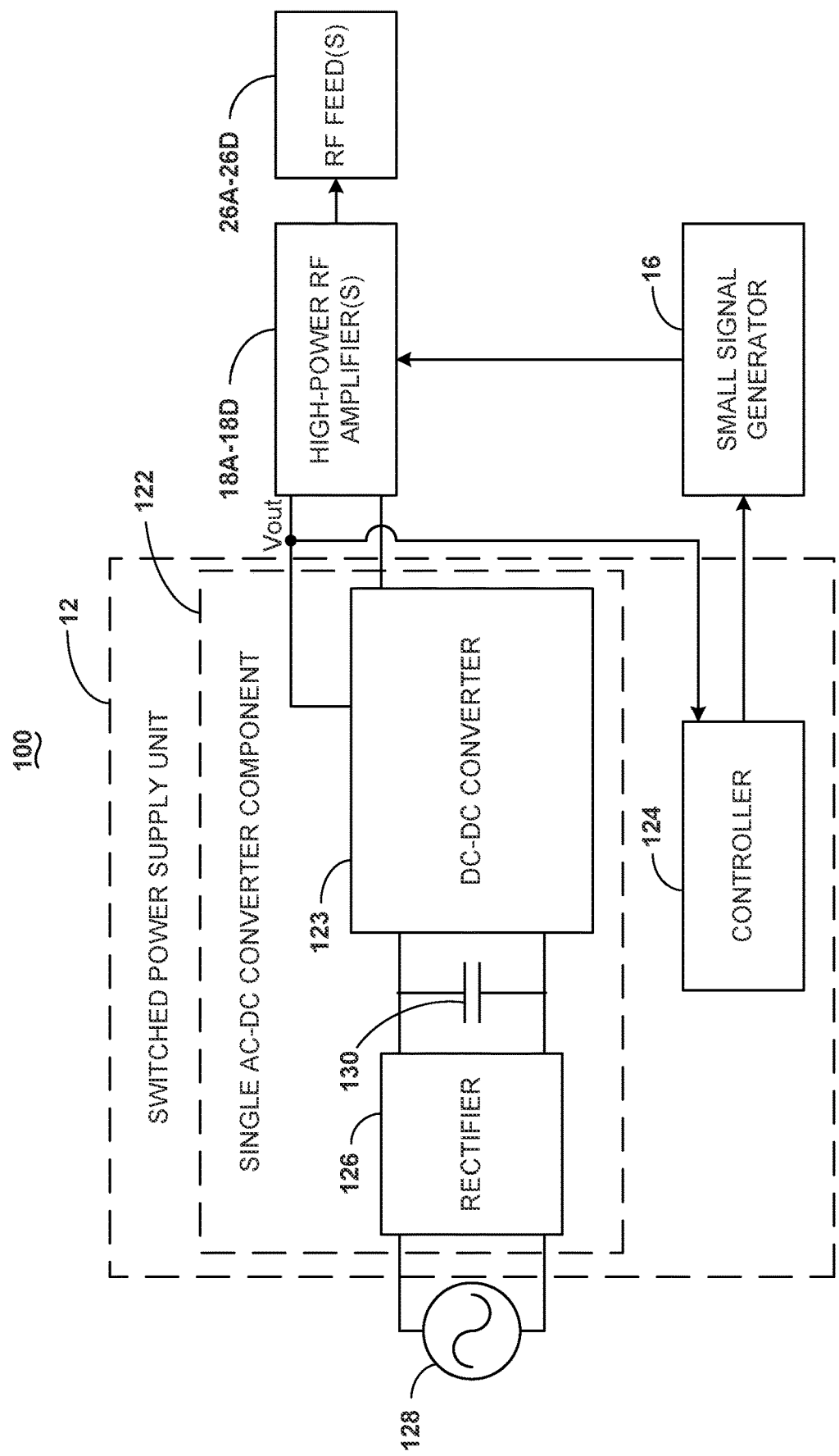
FIG. 6 is a block diagram of a solid state radio frequency generation system in accordance with various aspects described herein.
Figure 7:
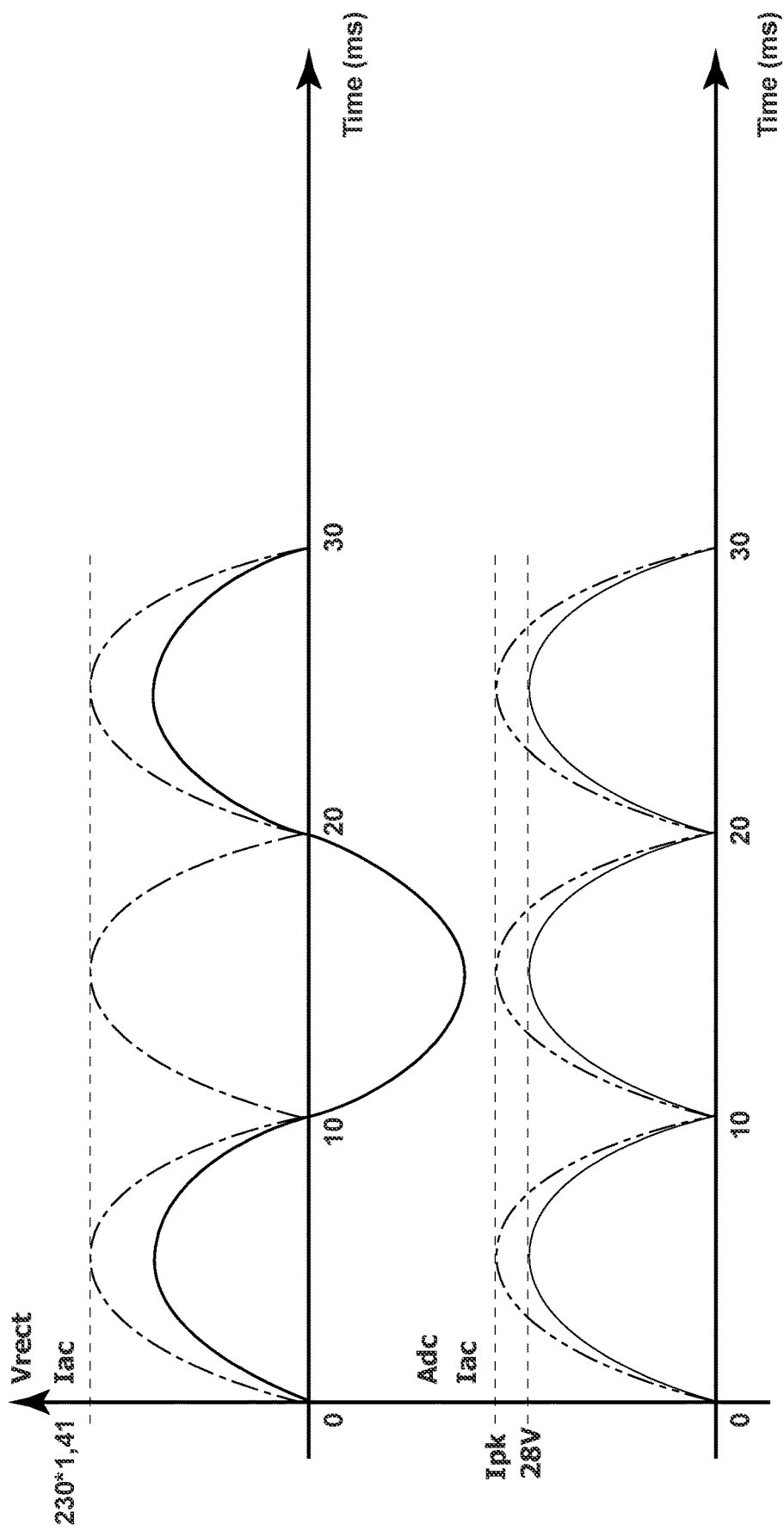
FIG. 7 is plot of the input and output current and voltage profiles of the solid state radio frequency generation system of a prior art power supply.

FIG. 6 shows a solid state radio frequency generation system 100 for an electromagnetic cooking device 10 having an enclosed cavity 20 (FIG. 4) in which a food load is placed. The solid state radio frequency generation system 100 includes at least one RF feed 26A-26D configured to introduce electromagnetic radiation into the enclosed cavity 20 to heat up and prepare the food load. The system 100 further includes at least one high-power RF amplifier 18A-18D coupled to the plurality of RF feeds 26A-26D, each high-power amplifier 18A-18D comprising at least one amplifying stage configured to output a signal that is amplified in power with respect to an input RF signal. A small signal generator 16 is coupled to the at least one high-power RF amplifier 18A-18D for generating the input RF signal. The system 100 further includes at least one switching power supply unit 12 coupled to the at least one high-power amplifier 18A-18D and the small signal generator 16. The switching power supply unit 12 includes at least one single stage AC-DC converter component 122 that converts the AC mains power 128 to a low voltage DC $V_{out}$ that is output to the at least one high-power amplifier 18A-18D. The single stage AC-DC converter 122 may be a flyback, a forward, a single-ended primary-inductor converter (SEPIC), etc. or may be an off-line resonant half bridge converter as described below with respect to FIGS. 9 and 10. The single AC-DC converter 122 includes a rectifier 126 for rectifying the AC mains power 128 to generate a rectified but non-smoothed DC voltage that is supplied to a non-smoothing capacitor 130 and then to a DC-DC converter 123. It should be noted that multiple single stage AC-DC converter components 122 may be provided particularly when multiple high-power RF amplifiers 18A-18D are used.

The switching power supply unit 12 further includes a controller 124 configured to adapt an input current from the AC mains power 128 to form a predefined periodic waveform with the same frequency as the AC mains power 128 that the controller 124 supplies to the small signal generator 16. In order to minimize the voltage ripple of the DC output, it is advantageous for the predefined periodic waveform to have a non sinusoidal shape. Thus, the controller 124 may distort the sinusoidal waveform of the input current from the AC mains power 128 by adding higher order harmonics improves the output voltage ripple. In particular, the non-sinusoidal waveform shape described in FIG. 9 (lac) is made by the addition of $1^{st}$, $3^{rd}$, $5^{th}$ . . . up to $21^{st}$ harmonics, each added as per 80% of the limits dictated by IEC61000-3-2 regulatory standard. The controller 124 may be a separate controller provided for the power supply unit 12 or may be controller 14 (FIG. 4) or RF controller 32 (FIG. 5). The controller 124 may be further configured to modulate an amplitude of the input RF signal generated by the small signal generator 16 based on the low voltage DC output $V_{out}$ by the switching power supply unit 12.

The output of the AC-DC converter component 122 feeds the high-power amplifiers 18A-D with a voltage $V_{out}$ that is intentionally not stabilized. The unstabilized voltage is characterized by a profile which is similar to the voltage across the DC-bus capacitor but scaled down by a given transformation ratio. If the high-power amplifiers 18A-D are designed for a maximum operating DC voltage of 28V, the output voltage of a converter appears as illustrated in FIG.

7. The DC-DC conversion stage 123 can be insulated (i.e. off-line) if the load requires insulation from the AC mains 128.

In order to prevent a loss in efficiency of the high-power amplifiers 18A-D, the magnitude of the input RF signal should be modulated in a way to keep the high-power amplifiers 18A-D in the so-called "compression point." which is achieved by a progressive reduction of the input RF tracking on the instantaneous profile of DC voltage $V_{dc}$. In addition to maximizing the efficiency of the high-power amplifiers 18A-D, this control method improves the power factor correction owing to the cooperative reduction of instantaneous power drawn by the high-power amplifiers 18A-D when the AC mains voltage reduces.

Figure 8:
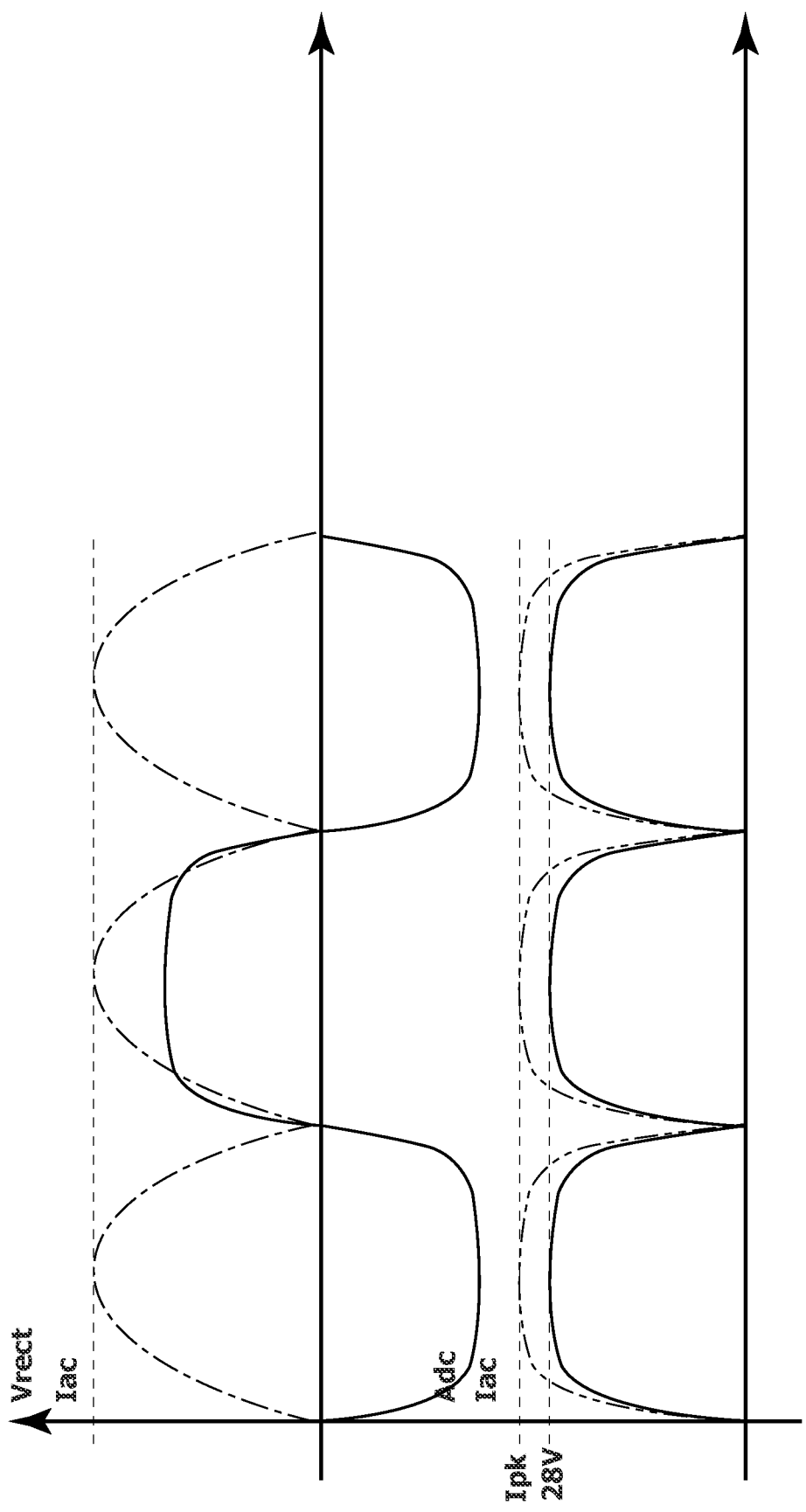
FIG. 8 is plot of the modified input and output current and voltage profiles of the solid state radio frequency generation system of FIG. 6.

As illustrated in FIG. 8, in order to reduce the crest factor of the output voltage and output power, the power supply unit 12 can be configured to deliberately increase its gain in the vicinity of the mains zero crossing to reduce the depth of the output voltage fluctuations. In the example shown in FIG. 8, both the input AC current and the output DC current are slightly distorted up to what is allowed by the IEC61000-3-2 standard on mains harmonic distortion.

Figure 9:
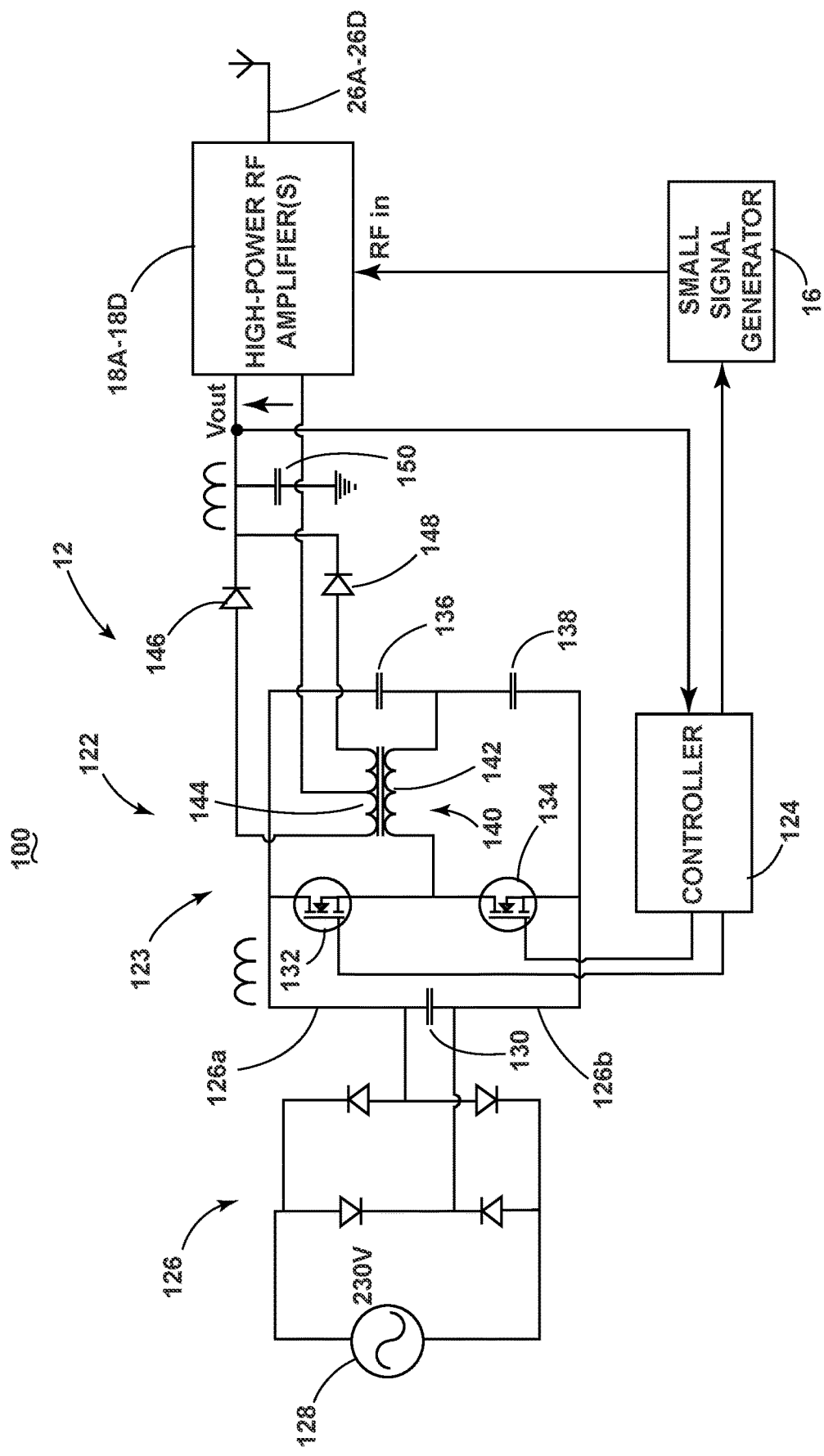
FIG. 9 is a schematic diagram illustrating one example of the solid state radio frequency generation system of FIG. 6.

FIG. 9 shows one embodiment of the solid state radio frequency generation system 100. As shown, the single AC-DC converter 122 includes a rectifier 126, which is implemented as a diode bridge and the DC-DC converter 123 is implemented as an off-line resonant half bridge DC-DC converter. The the single AC-DC converter 122 further includes a non-smoothing capacitor 130 coupled between first and second output lines 126a and 126b of the rectifier 126. Thus, the AC mains line 128 is rectified and fed in to the non-smoothing capacitor 130 acting as the DC-bus for the off-line resonant half bridge DC-DC converter 123. The off-line resonant half bridge DC-DC converter 123 may include a first switching transistor 132 and a second switching transistor 134 coupled in series with one another between the first and second output lines 126a and 126b of the rectifier 126. The controller 124 controls the switching state and frequency of the first and second switching transistors 132 and 134. The off-line resonant half bridge DC-DC converter 123 may further include a first capacitor 136 and a second capacitor 138 coupled in series with one another between the first and second output lines 126a and 126b of the rectifier 126 in parallel with the first and second switching transistors 132 and 134. A transformer 140 is provided having a primary winding 142 coupled at a first end between the first and second switching transistors 132 and 134 and coupled at a second end between the first and second capacitors 136 and 138, and a secondary winding 144 from which the low voltage DC output $V_{out}$ of the switching power supply unit 12 is supplied.

The controller 124 is coupled to the secondary winding 144 of the transformer 140 to receive the low voltage DC output $V_{out}$. The controller 124 monitors the low voltage DC output $V_{out}$ and changes the switching frequency of the off-line resonant half bridge converter 122 to control an average voltage output of the low voltage DC output $V_{out}$. The output voltage is not constant, but fluctuating along with the rectified mains voltage at a lower voltage magnitude according to the instantaneous gain of the converter which is a known function of the half bridge switching frequency. The controller 124 is further configured to modulate an amplitude of the input RF signal generated by the small signal generator 16 based on the low voltage DC $V_{out}$ output by the switching power supply unit 12. The amplitude of the input RF signal is modulated by the controller 124 such that the input RF signal has an amplitude corresponding to one of a desired current set point and a desired power set point.

Figure 10:
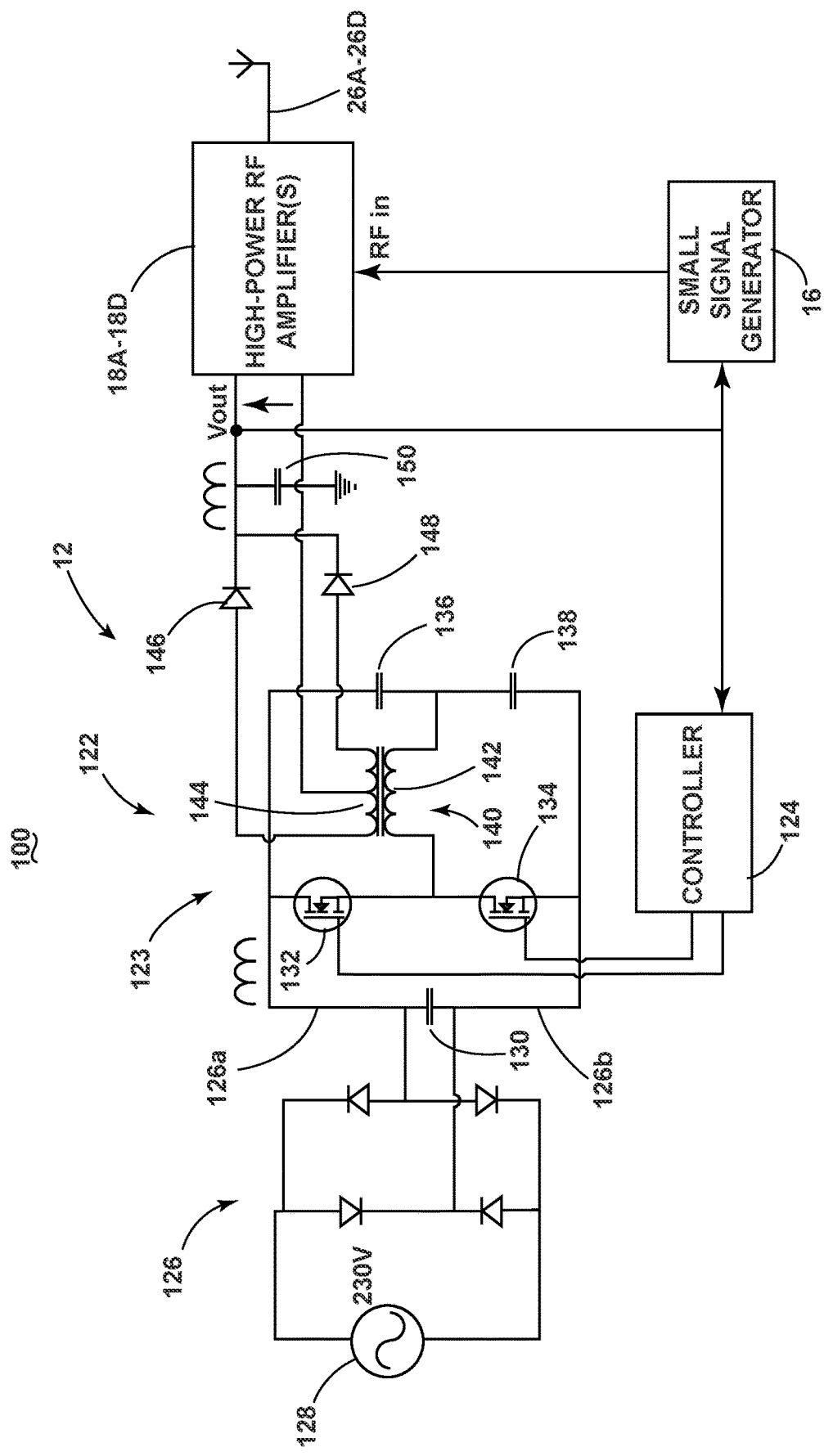
FIG. 10 is a schematic diagram illustrating another example of the solid state radio frequency generation system of FIG. 6.

FIG. 10 shows an alternative embodiment that is similar to the embodiment of FIG. 9 with the exception that the controller 124 implements a control strategy aimed at outputting a voltage $V_{out}$ with a desired average value and an input current having a predefined waveform (e.g., as shown in FIG. 8). The small signal generator 16 samples the instantaneous DC voltage in order to keep the high-power amplifiers 18A-D at their maximum efficiency at any given instantaneous DC voltage.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A solid state radio frequency generation system for an electromagnetic cooking device having an enclosed cavity in which a food load is placed, the solid state radio frequency generation system comprising:
    an RF feed configured to introduce electromagnetic radiation into the enclosed cavity to heat up and prepare the food load;
    a RF amplifier coupled to the RF feed, the RF amplifier comprising at least one amplifying stage configured to output a signal that is amplified in power with respect to an input RF signal;
    a small signal generator coupled to the RF amplifier for generating the input RF signal; and
    a switching power supply unit coupled to the RF amplifier and the small signal generator, wherein the switching power supply comprises a single AC-DC converter component that converts AC mains power to a lower voltage DC that is output to the RF amplifier, and a controller configured to distort a sinusoidal input current from the AC mains power to form a predefined periodic non-sinusoidal waveform with the same frequency as the AC mains power in order to minimize output voltage ripple.

2. The solid state radio frequency generation system of claim 1, wherein the controller is further configured to modulate an amplitude of the input RF signal generated by the small signal generator based on the lower voltage DC output by the switching power supply unit.

3. The solid state radio frequency generation system of any one of claims 1 and 2, wherein the single AC-DC converter component further comprises a rectifier for rectifying the AC mains power.

4. The solid state radio frequency generation system of claim 3, wherein the single AC-DC converter component further comprises a non-smoothing capacitor coupled between first and second output lines of the rectifier.

5. The solid state radio frequency generation system of claim 1, wherein the single AC-DC converter further comprises an off-line resonant half bridge DC-DC converter.

6. The solid state radio frequency generation system of claim 5, wherein the off-line resonant half bridge DC-DC converter comprises:
    a first switching transistor and a second switching transistor coupled in series with one another between the first and second output lines of the rectifier, wherein the controller controls the switching state and frequency of the first and second switching transistors;
    a first capacitor and a second capacitor coupled in series with one another between the first and second output lines of the rectifier in parallel with the first and second switching transistors; and
    a transformer having a primary winding coupled at a first end between the first and second switching transistors and coupled at a second end between the first and second capacitors, and a secondary winding from which the lower voltage DC output of the switching power supply unit is supplied.

7. The solid state radio frequency generation system of claim 6, wherein the controller is coupled to the secondary winding of the transformer to receive the lower voltage DC output.

8. The solid state radio frequency generation system of claim 5, wherein the controller monitors the low voltage DC output and changes the switching frequency of the off-line resonant half bridge DC-DC converter to control an average voltage output of the lower voltage DC output.

9. The solid state radio frequency generation system of claim 2, wherein the controller is further configured to modulate an amplitude of the input RF signal generated by the small signal generator based on the low voltage DC output by the switching power supply unit, wherein the amplitude of the input RF signal is modulated by the controller such that the input RF signal has an amplitude corresponding to one of a desired current set point and a desired power set point.

10. The solid state radio frequency generation system of claim 1, wherein the controller controls the small signal generator to modulate the magnitude of the input RF signal to progressively reduce the input RF tracking on an instantaneous profile of the lower voltage DC output such that the amplifier operates at a compression point thereby maximizing an efficiency of the RF amplifier.

11. The solid state radio frequency generation system of claim 1, wherein the controller cooperatively reduces instantaneous power drawn by the RF amplifier when the voltage of the AC mains power decreases.

12. The solid state radio frequency generation system of claim 1, wherein the controller increases the gain of the switching power supply unit in a vicinity of the AC mains power zero crossing to reduce a depth of fluctuations in the output voltage.

13. A solid state radio frequency generation system for an electromagnetic cooking device having an enclosed cavity in which a food load is placed, the solid state radio frequency generation system comprising:
    a plurality of RF feeds configured to introduce electromagnetic radiation into the enclosed cavity to heat up and prepare the food load;
    a set of RF amplifiers coupled to the plurality of RF feeds, each RF amplifier comprising at least one amplifying stage configured to output a signal that is amplified in power with respect to an input RF signal;
    a small signal generator coupled to the set of RF amplifiers for generating the input RF signal; and
    a switching power supply unit coupled to the set of RF amplifiers and the small signal generator, wherein the switching power supply comprises at least one single stage AC-DC converter component that converts AC mains power to lower voltage DC that is output to the set of RF amplifiers, and a controller configured to distort a sinusoidal input current from the AC mains power to form a predefined periodic non-sinusoidal waveform with the same frequency as the AC mains power in order to minimize output voltage ripple.

14. The solid state radio frequency generation system of claim 13, wherein the controller controls the small signal generator to modulate the magnitude of the input RF signal to progressively reduce the input RF tracking on an instantaneous profile of the lower voltage DC output such that each amplifier of the set of amplifiers operates at a compression point thereby maximizing an efficiency of the set of RF amplifiers.

15. The solid state radio frequency generation system of claim 13, wherein the controller cooperatively reduces instantaneous power drawn by the set of RF amplifiers when the voltage of the AC mains power decreases.

16. The solid state radio frequency generation system of claim 13, wherein the controller increases the gain of the switching power supply unit in a vicinity of the AC mains power zero crossing to reduce a depth of fluctuations in the output voltage.

17. An electromagnetic cooking device comprising:
an enclosed cavity in which a food load is placed;
a plurality of RF feeds configured to introduce electromagnetic radiation into the enclosed cavity to heat up and prepare the food load;
a set of RF amplifiers coupled to the plurality of RF feeds, each RF amplifier comprising at least one amplifying stage configured to output a signal that is amplified in power with respect to an input RF signal;
a small signal generator coupled to the set of RF amplifiers for generating the input RF signal; and
a switching power supply unit coupled to the set of RF amplifiers and the small signal generator, wherein the switching power supply comprises at least one single stage AC-DC converter component that converts AC mains power to a lower voltage DC that is output to the set of RF amplifiers, and a controller configured to distort a sinusoidal input current from the AC mains power to form a predefined periodic non-sinusoidal waveform with the same frequency as the AC mains power in order to minimize output voltage ripple, wherein the controller is further configured to modulate an amplitude of the input RF signal generated by the small signal generator based on the lower voltage DC output by the switching power supply unit.

18. The electromagnetic cooking device of claim 17, wherein the controller controls the small signal generator to modulate the magnitude of the input RF signal to progressively reduce the input RF tracking on an instantaneous profile of the lower voltage DC output such that each of the sets amplifiers operates at a compression point thereby maximizing an efficiency of the set of RF amplifiers.

19. The electromagnetic cooking device of claim 17, wherein the controller cooperatively reduces instantaneous power drawn by the set of RF amplifiers when the voltage of the AC mains power decreases.

20. The electromagnetic cooking device of claim 17, wherein the controller increases the gain of the switching power supply unit in a vicinity of the AC mains power zero crossing to reduce a depth of fluctuations in the output voltage.

* * * * *